United States Patent [19]

Caverly, Jr. et al.

[11] Patent Number: 4,541,970
[45] Date of Patent: Sep. 17, 1985

[54] METHOD FOR FABRICATING A CABLE CORE INCLUDING OPTICAL FIBERS

[75] Inventors: Lendall R. Caverly, Jr., Barrington, N.H.; Robert F. Gleason, Freehold, N.J.; Don A. Hadfield, North Hampton, N.H.; Norman E. McNerney, Hampton, N.H.; Daniel A. Meade, Durham, N.H.; Alfred G. Richardson, Aberdeen, N.J.; Nicholas Semitros, Somersworth; Martin Q. Thornton, Strafford, both of N.H.

[73] Assignee: AT&T Bell Laboratories, Murray Hill, N.J.

[21] Appl. No.: 469,428

[22] Filed: Feb. 24, 1983

[51] Int. Cl.[4] .............................................. G02B 5/14
[52] U.S. Cl. .................................... 264/1.5; 264/174; 425/114
[58] Field of Search .................. 264/1.5, 174; 425/114

[56] References Cited

U.S. PATENT DOCUMENTS

| | | | |
|---|---|---|---|
| 4,156,104 | 5/1979 | Mondello | 350/96.23 |
| 4,199,224 | 4/1980 | Oestreich | 350/96.23 |
| 4,205,899 | 6/1980 | King et al. | 264/1.5 |

OTHER PUBLICATIONS

*Proceedings of 27th International Wire and Cable Symposium*, "Design and Manufacture of an Experimental Lightguide Cable for Undersea Transmission Systems", Gleason et al., Nov. 1978, pp. 385-389.

*Primary Examiner*—James Lowe
*Attorney, Agent, or Firm*—Richard B. Havill

[57] ABSTRACT

There is disclosed a method for fabricating an undersea communications cable core containing optical fibers. The method includes heating a central strength member and extruding a first layer of thermoplastic elastomer onto the heated central strength member. Paying out the optical fibers from a plurality of bobbins. Helically laying the optical fibers onto the first layer of thermoplastic elastomer with a planetary motion. The optical fibers passing entirely enclosed through a separate part of a whipping prevention enclosure from the bobbins to a rotating closing die. Passing the central strength member, coated with the first layer of thermoplastic elastomer and helically wrapped with the optical fibers, through the closing die, which rotates with the rotation of the helix, applying to the optical fibers forces directed radially into the core but without applying to the optical fibers forces directed tangentially to the surface of the first layer of thermoplastic material. Extruding a second layer of thermoplastic elastomer over the fibers to merge with the first layer of thermoplastic elastomer.

4 Claims, 4 Drawing Figures

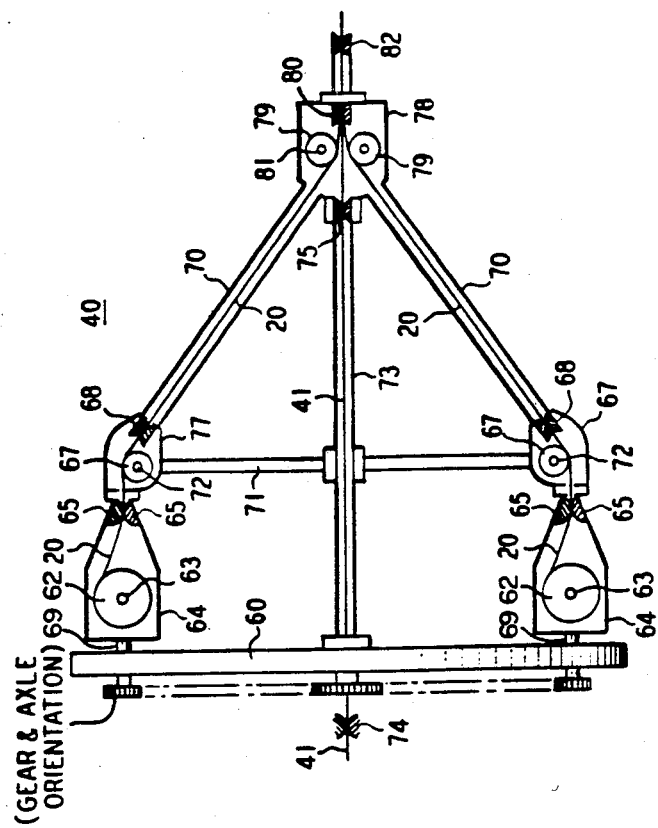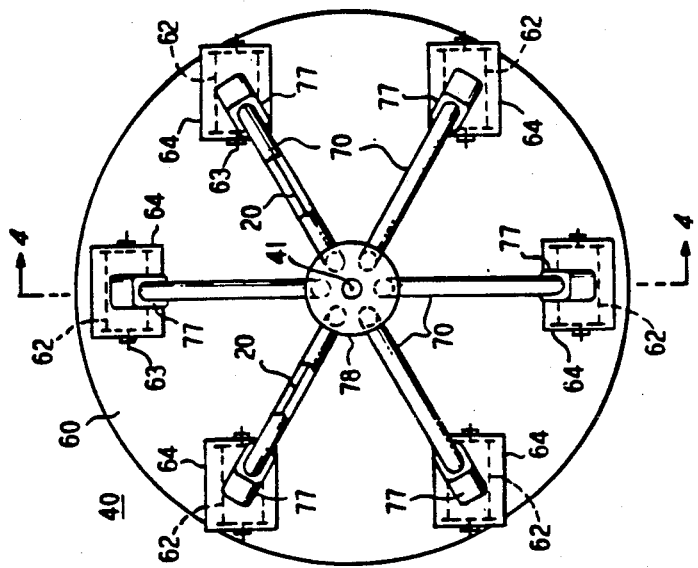

METHOD FOR FABRICATING A CABLE CORE INCLUDING OPTICAL FIBERS

BACKGROUND OF THE INVENTION

The invention relates to a method for fabricating a cable core containing optical fibers.

Optical fiber cables have been manufactured and deployed in telecommunication systems, but have not been manufactured for use in long distance undersea communication systems. Any communications cable laid on the ocean floor is subjected to some obvious environmental factors, such as low temperature, high compressive pressure and corrosive water. Additionally it is necessary for an undersea cable to withstand large tensile and bending stresses encountered during cable laying and recovery operations.

Heretofore, an undersea cable containing optical fibers was described in U.S. Pat. No. 4,156,104, issued to R. C. Mondello. Such cable included stranded steel wires separated from a central filament by a core in which the fibers are embedded.

A problem arises in the cable including the optical fibers when the cable and its core are used in an undersea communications system. The measured loss of the optical fibers included in the cable is dependent upon strain in the cable. Strain in the cable during manufacture, deployment, and operation of the cable system causes large fluctuations in optical loss in the fibers thus complicating the processes of starting up, lining up and operating the undersea communication system.

SUMMARY OF THE INVENTION

This problem is solved by a new method for making a cable core including optical fibers.

Such new method includes heating a central strength member and extruding a first layer of thermoplastic elastomer onto the heated central strength member. Paying out the optical fibers from a plurality of bobbins. Laying the optical fibers onto the first layer of thermoplastic elastomer with a planetary motion. The optical fibers passing entirely enclosed from the bobbins to a rotating closing die. Extruding a second layer of thermoplastic elastomer over the fibers to merge with the first layer.

BRIEF DESCRIPTION OF THE DRAWINGS

A better understanding of the invention may be derived from the following detailed description when that description is read in view of the appended drawings wherein

FIG. 3 is a front elevation diagrammatic sketch of a planetary strander for laying optical fibers; and FIG. 4 is a cutaway side view diagrammatic sketch of the planetary strander and taken along the center line of FIG. 3.

DETAILED DESCRIPTION

Figure 1:
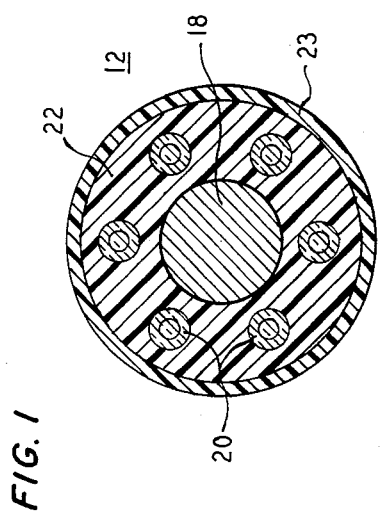
FIG. 1 is a cross-sectional view of an embodiment of a communications cable core including optical fibers.

Referring now to FIG. 1, there is shown a cross-section 12 of an undersea communications cable core containing optical fibers arranged for transmission of optical signals. The cable core 12 includes a central elongated strength member, or kingwire, 18, optical fibers 20 imbedded in a thermoplastic elastomer 22, and a polymer stretch 23 surrounding the elastomer.

The central elongated strength member, or kingwire, 18, is a circular cross-section center wire which provides strength to the core 12 during the processes of fabricating the core and the cable. A high strength copper clad steel typically is used. The circumference of the strength member is shown as a heavy line to represent the copper cladding. A typical diameter of the center wire is 0.8 millimeters. The minimum cross-sectional size of the kingwire 18 is determined by the tensile and bending strengths required for cable fabrication processes. During two processing operations of the cable core fabrication processes the kingwire is used as the principal strength member. The kingwire is used for pulling the growing core through various equipments as materials are added step by step in each of the operations.

After the core is completely fabricated, it is put into a cable and is deployed to and operated on the ocean floor, the center wire 18 may serve as a center conductor of a coaxial cable arrangement that is used for low frequency signalling of surveillance, maintenance and control information. Because of the coaxial center conductor function, the kingwire is selected to have a conductivity of at least 40 percent of the conductivity of an equal size wire of electrolytic copper. If the center wire is not used as a conductor, the copper cladding and high conductivity are not essential.

In an alternative arrangement of the cable for use in a terrestrial communication system that does not use signalling but operates in ambient temperatures which vary much more widely than ocean temperatures, the central elongated strength member may be fabricated out of high strength glass, such as a bundle of high strength glass fibers embedded in a polymer.

The elastomer 22 is an optical fiber encapsulant, such as an extrusion grade thermoplastic polyester, which is supplied under the name HYTREL by E. I. du Pont de Nemours and Company and which is applied to the kingwire 18 during the first core fabrication operation. Detailed information describing the family of HYTREL polyesters is presented in *Rubber Age*, 104, 3, pages 35–42 (1972); *Proceeding of the Intenational Wire and Cable Symposium*, pages 192–299 (1975); and *Polymer Engineering and Science*, Vol. 14, No. 12, pages 848–852 (December 1974). The thermoplastic elastomer completely encapsulates several separate optical fibers for protecting them and positioning them near the center of the cable. In this arrangement the fibers are located near the neutral bending axis of the cable. Since the elastomer completely surrounds each fiber within the core, it forms a buffer for isolating each fiber from any residual localized loads resulting from sea bottom pressure. Thereby microbending of the fibers and associated optical losses caused by such microbending are minimized with respect to the effects of sea bottom pressure.

Figure 2:
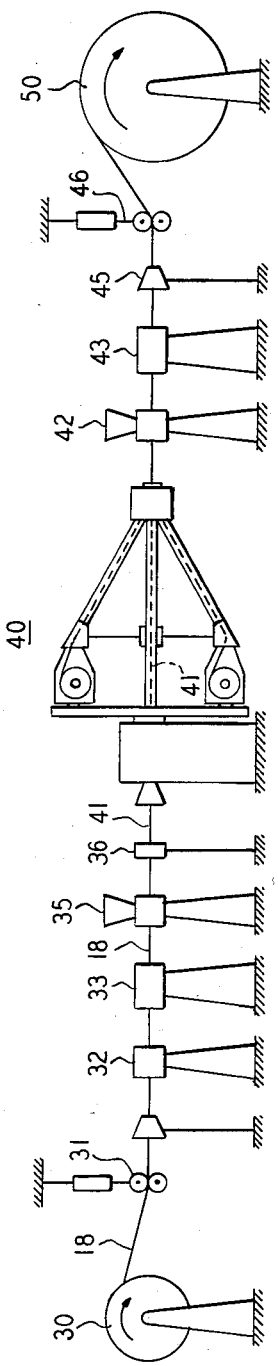
FIG. 2 is a side elevation sketch of machinery positioned in a line for fabricating a cable core including optical fibers, in accordance with FIG. 1.

FIG. 2 shows a line of machinery which is used for fabricating the cable core through a first series of processing steps. In the core fabrication processing, the kingwire 18 is unwound from a reel 30 at a controllable tension and speed. Tension is held constant by a dancer 31. The kingwire is straightened, cleaned in a trichloroethane bath 32, and heated in a heater unit 33. A first layer of the thermoplastic elastomer, which is heated into a plastic state, is extruded by an extruder 35 directly over the heated kingwire 18. A gauge 36 determines the thickness of the elastomer and adjusts the speed of the wire to maintain elastomer thickness within predetermined limits. A planetary strander 40 lays helically typically six to twelve optical fibers over the first layer of elastomer with a planetary motion and spaced equally apart over the first layer of elastomer.

As shown in FIGS. 3 and 4, the planetary strander 40 is designed for wrapping one or more optical fibers around the coated kingwire 41 with a planetary motion while the kingwire passes through the center of the strander without any twisting motion. A wheel 60 is designed to rotate about the coated kingwire carrying one or more bobbins 62, each supplying a continuous length of optical fiber. An axial tube 73 forms the rotating axle for the wheel 60 and the rest of the planetary strander 40. The coated kingwire passes through the axial tube 73 from left to right in FIG. 4. An entrance guide 74 and an exit guide 75 hold the coated kingwire at the center axis of the tube 73. Each bobbin 62 has an axle 63 which is fixed in orientation, for instance, parallel with respect to the floor or the foundation of the strander 40. Each bobbin 62 stores a length of optical fiber 20 that is payed out for wrapping helically about the first layer of elastomer coating the kingwire.

Each bobbin 62 is mounted to pay out the fiber straight to a guide and sheave to minimize change of fiber length between the bobbin and a closing die 80, as the bobbin 62 and the wheel 60 rotate about the kingwire. Also every bobbin 62 is separately enclosed by a housing 64 that rotates about the coated kingwire with the wheel 60 and the enclosed bobbin. As the housing 64 rotates with the wheel 60, the housing is free to revolve about an axis 69. Axles 69 for all of the housings 64 are parallel with one another and with the coated kingwire 41. A permanent magnet hysteresis brake provides a constant torque for controlling fiber tension. The housing 64 also holds a guide 65 having a center hole for keeping the optical fiber on the center line of the axle 69 as they both rotate about the kingwire on the circumference of a circle.

Upon leaving the guide 65, the fiber 20 passes over a sheave 67 and through another guide 68 into a tube 70. The sheave 67 is mounted on a spoke 71 which is fixed to the axial tube 73. Thus the sheave 67 rotates about its axle 72 while that axle is fixed in position with respect to the axial tube 73 that surrounds the coated kingwire 41.

Each tube 70 encloses an optical fiber from the exit of a bobbin sheave housing 77 to the entrance of a closing die housing 78. The bobbin sheave housing 77 encloses the sheave 67 and the guide 68 thus providing an enclosure for the fiber basically from the guide 65 to the tube 70. When the optical fiber leaves the tube 70 and goes into the closing die housing 78, the fiber passes over a closing die sheave 79 and into a rotating closing die 80. There are one or more closing die sheaves 79, each of which is mounted on a spoke fixed to the axial tube 73. An axle 81 of each closing die sheave 79 is fixed in position with respect to the axial tube 73 and the axle 72 of the associated sheave 67. Thus the sheave 67 and the associated closing die sheave 79 rotate together about the axial tube 73 and change the direction of optical fiber travel between the bobbin 62 and the rotating closing die 80. A constant fiber length is maintained between the guide 65 and the rotating closing die 80. Very little change of fiber length occurs between the bobbin and its associated guide 65 during each rotation of the wheel 60. Change of fiber length between the bobbins 62 and the rotating closing die 80 is minimized by positioning each bobbin to pay out through the guide 65 and over the sheave 67 both of which are fixed in position with respect to the closing die sheave 79 and the rotating closing die 80.

Each group of housings 64, 77 and 78 and the tube 70 encloses one of the optical fibers continuously from the bobbin 62 to the rotating closing die 80. During operation this enclosure arrangement prevents whipping of the fiber.

The rotating closing die 80 is designed to close the optical fibers onto the coated kingwire 41. Die 80 is sized to hold the optical fiber snuggly to the first layer of the elastomer. The die 80 rotates with the wheel 60, the axial tube 73, and the closing die sheaves 79 for closing the optical fibers against the first layer of the elastomer by applying a force directed radially into the core but without applying lateral forces to the fibers, i.e., forces directed tangentially to, or side-to-side with respect to, the surface of the elastomer.

Because the coated kingwire 41 passes straight through the axial tube 73 and the fibers are wrapped around the coated kingwire, the fibers are laid down helically over the first layer of elastomer 22 of FIG. 1. Since the axles 63 of the bobbins 62 are held in an orientation that is fixed with respect to the floor, the fibers are laid helically with a planetary motion. Thus very little twist is induced into the fiber.

Upon leaving the rotating closing die 80 of FIG. 4, the growing cable core passes through a stationary closing die 82 for establishing the position of the several optical fibers within predetermined tolerances.

Referring once again to FIG. 2, a second layer of thermoplastic elastomer is extruded in a plastic state by an extruder 42. This second layer of elastomer, however, is extruded over the first layer of elastomer and the optical fibers. The second layer of thermoplastic elastomer merges with the first layer of elastomer between the optical fibers thereby completely surrounding each of the fibers with the thermoplastic elastomer.

The first core fabrication operation is completed by passing the partially completed core through a water bath 43 for cooling the core. Once cooled the core is run through a guide 45 and a dancer 56 before it is wound onto a take-up reel 50. All of the foregoing steps of fabrication are completed in a single continuous pass through the line of machinery, shown in FIG. 2.

In the second core fabrication operation, the outer surface of the elastomer 22 of FIG. 1 is covered by the protective polymer sheath 23. One type of polymer used for the sheath is Zytel 153L, NC10 that is a nylon 6/12 supplied by the E. I. du Pont de Nemours and Company. This sheath has a melting point at 213° Centigrade. The polymer is selected to have a high flexural modulus, high abrasion resistance and high strength in addition to the desired high melting point. It is relatively tough and absorbs as little water as possible. In this second core fabrication operation, the partially completed core is unwrapped from the reel, and the polymer sheath 23 is extruded over the elastomer 22. The polymer is heated to its plastic state before it is extruded. This sheath completes the core 12 of FIG. 1 which again passes through a water bath for cooling before the completed core is wound onto a take-up reel.

Since the elastomer 22 completely surrounds the fibers 20 and the polymer sheath 23 surrounds the elastomer, the fibers track the elastomer and the sheath.

Fabrication of this complete core 12 into a complete cable structure is accomplished in two additional operation. Details of the cable fabrication process are presented in U.S. Pat. No. 4,484,963 to Anctil et al.

The foregoing describes a method for fabricating a cable core including optical fibers in accordance with the invention. That method together with other similar methods, which are obvious therefrom to those skilled in the art, are considered to be within the scope of the invention.

What is claimed is:

1. A method for fabricating a cable core including a plurality of optical fibers, the method comprising the steps of heating a central strength member;

extruding a first layer of a thermoplastic material onto the heated central strength member;

with a planetary strander helically laying the plurality of optical fibers with a planetary motion onto the first layer of thermoplastic material;

a plurality of bobbins within the strander pay out the optical fibers;

the optical fibers pass entirely enclosed, each fiber passing through a separate part of a whipping prevention enclosure, from the bobbins to a rotating closing die;

the central strength member, coated with the first layer of the thermoplastic material and helically wrapped with the optical fibers, passes through the closing die, which rotates with the rotation of the helix, applying to the optical fibers forces directed radially into the cable core but without applying to the optical fibers forces directed side-to-side with respect to the surface of the first layer of thermoplastic material; and extruding a second layer of the thermoplastic material over the plurality of optical fibers to merge with the first layer of thermoplastic material.

2. A method for fabricating a cable core in accordance with claim 1 wherein the bobbins and a plurality of fiber guides disposed between the bobbins and the closing die are arranged for minimizing fiber length variation between the bobbins and the closing die during each rotation of the planetary strander.

3. A method for fabricating a cable core including a plurality of optical fibers, the method comprising the steps of heating a central strength member, extruding a first layer of thermoplastic material onto the heated central strength member;

paying each optical fiber off of a separate bobbin and through a separate part of a whipping prevention enclosure, entirely enclosing the fiber, to a rotating closing die;

helically laying the plurality of optical fibers with a planetary motion onto the first layer of thermoplastic material;

passing the central strength member, coated with the first layer of the thermoplastic material and helically wrapped with the optical fibers, through the closing die, which rotates with the rotation of the helix, applying to the optical fibers forces directed radially into the core but without applying to the optical fibers forces directed tangentially to the surface of the first layer of thermoplastic material; and extruding a second layer of the thermoplastic material over the plurality of optical fibers to merge with the first layer of thermoplastic material.

4. A method for fabricating a cable core in accordance with claim 3 wherein each optical fiber passes from one of the bobbins to the closing die by way of guides arranged for minimizing optical fiber length variation between the one bobbin and the closing die during each helical rotation of the optical fiber around the first layer of thermoplastic material.

* * * * *